United States Patent
Navulur

(10) Patent No.: US 11,071,917 B1
(45) Date of Patent: *Jul. 27, 2021

(54) SYSTEM, METHOD, AND COMPUTER PROGRAM PRODUCT FOR EXTRACTING LOCATION INFORMATION USING GAMING TECHNOLOGIES FROM REAL WORLD DATA COLLECTED BY VARIOUS SENSORS

(71) Applicant: Kumar Chandra Sekhar Navulur, Frederick, CO (US)

(72) Inventor: Kumar Chandra Sekhar Navulur, Frederick, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/791,097

(22) Filed: Feb. 14, 2020

Related U.S. Application Data

(63) Continuation of application No. 16/179,773, filed on Nov. 2, 2018, now Pat. No. 10,603,591.

(51) Int. Cl.
*A63F 13/65* (2014.01)
*H04W 4/021* (2018.01)

(52) U.S. Cl.
CPC .............. *A63F 13/65* (2014.09); *H04W 4/021* (2013.01); *A63F 2300/5573* (2013.01); *A63F 2300/8082* (2013.01)

(58) Field of Classification Search
CPC ...... A63F 13/216; A63F 13/33; A63F 13/332; A63F 13/52; A63F 13/53; A63F 13/65
See application file for complete search history.

(56) References Cited

U.S. PATENT DOCUMENTS

| 2011/0055927 A1* | 3/2011 | Hamilton, II ......... G06F 16/285 726/26 |
| 2019/0051051 A1* | 2/2019 | Kaufman .................. G06F 3/01 |

* cited by examiner

*Primary Examiner* — Omkar A Deodhar
(74) *Attorney, Agent, or Firm* — Plager Schack LLP; Mark H. Plager; Alexis J. Saenz

(57) ABSTRACT

A system and processes provide a solution to object identification in images using a game environment to confirm the presence (or absence) of suspected points of interest in the real-world. A game environment uses data gathered by real-world sensors to replicate a real-world location as a gaming environment. Unconfirmed suspected points of interest (locations and/or objects) may be placed into the game environment. Various types of game play may be used to have players interact with the game environment. The actions by players may confirm whether a suspected point of interest is actually present in the real-world. Confirmation data of the presence of points of interest may be forwarded to an external database which may update a map file based on the data provided by player interaction in the game.

10 Claims, 3 Drawing Sheets

SYSTEM, METHOD, AND COMPUTER PROGRAM PRODUCT FOR EXTRACTING LOCATION INFORMATION USING GAMING TECHNOLOGIES FROM REAL WORLD DATA COLLECTED BY VARIOUS SENSORS

CROSS-REFERENCE TO RELATED APPLICATIONS

This application claims benefit under 35 U.S.C. § 119(e) of U.S. Non-Provisional application having Ser. No. 16/179,773 filed Nov. 2, 2018, which is hereby incorporated by reference herein in its entirety.

BACKGROUND

The embodiments herein relate generally to image processing and analysis, and more particularly, to a system, method, and computer program product for extracting location information using gaming technologies from real world data collected by various sensors.

There is a deluge of sensors collecting data about our world from images/pictures from sources ranging from satellites, planes, drones, and cameras on smart phones. These pictures are taken in various spectral ranges including the visible spectrum to infra-red, ultra-violet, and thermal parts of the Sun's electro-magnetic spectrum. The amount of data collected by these sensors has created a big data problem and currently the analysis from the artificial intelligence technologies is not reliable, nor scalable/economical. A technological problem exists where current technology cannot identify many objects in an image.

For example, in wide area surveillance systems, it is difficult for conventional systems to identify and distinguish one structure from any other object. In an urban setting the objects may appear to be densely connected and are sometimes indistinguishable from one another (for example, one building may not be distinguishable from another building or other adjacent structure); especially when viewed from directly overhead by aerial or satellite imagery.

Many of the objects currently require a person to identify them. Location information such as roads, sidewalks, etc. can easily be identified by the human eye. However, there are not enough analysts to interpret the data. Thus, current technology is lacking in the ability to identify and confirm the presence of objects and location to create location information databases from these diverse datasets.

SUMMARY

In an exemplary embodiment of the present invention, a computer program product for extracting real-world locations and objects for map making is disclosed. The computer program product comprises a non-transitory computer readable storage medium having computer readable program code embodied therewith. The computer readable program code is configured to: gather data of real-world locations and real-world objects; simulate a real-world location based on the gathered data through an electronic gaming environment, wherein the electronic gaming environment includes game features representing points of interest; receive a login of a player for participation in a game within the electronic gaming environment; track actions of the player in the simulated real-world location, wherein the actions include interacting with or marking the points of interest; export tracked actions to a database; confirm the presence of real-world locations and real-world objects based on the tracked actions; and generate an updated map of the real-world location using the confirmed presence of real-world locations and real-world objects.

In another exemplary embodiment, a method for extracting real-world locations and objects for map making, comprises: gathering data of real-world locations and real-world objects; simulating a real-world location based on the gathered data through an electronic gaming environment, wherein the electronic gaming environment includes game features representing points of interest; receiving a login of a player for participation in a game within the electronic gaming environment; tracking actions of the player in the simulated real-world location, wherein the actions include interacting with or marking the points of interest; exporting tracked actions to a database; confirming the presence of real-world locations and real-world objects based on the tracked actions; and generating an updated map of the real-world location using the confirmed presence of real-world locations and real-world objects.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In general, embodiments of the subject technology provide a system and process that uses gaming systems to generate a confirmed mapping of real-world locations and objects/places in those locations. The process includes generating a gaming environment simulating a location. Players are invited to play a game online or offline that uses the simulated location. As players interact with the simulated environment, players take actions that confirm an object or specific place which are registered in the system along with real world coordinates (for example, latitude, longitude, and elevation) so that new maps with confirmed real-world object locations can be generated (or updated) and used for example, by third parties for more accurate maps.

The embodiments disclosed below provide more than a gaming system. Aspects of the subject technology leverage the activity of gaming to confirm the presence of real-world locations and objects, within the game. As discussed above, there is a particular problem present in the field of electronic cartography and image processing and analysis. For example, object recognition in especially dense or crowded scenes may require substantial computing resources; usually more resources than can process the details in a picture that is being used to map an area. Aspects of the subject technology may provide various solutions to one or more problems. For example, the embodiments described solve the problem of optical systems failing to recognize objects and/or locations by simulating a real-world location and tracking the electronic registration of player activity in the simulated environment to confirm the presence of objects in the location (or the location itself).

In the description that follows, some elements may be process steps. To distinguish between process steps and physical elements, the process steps will be shown in parenthesis.

Figure 1:
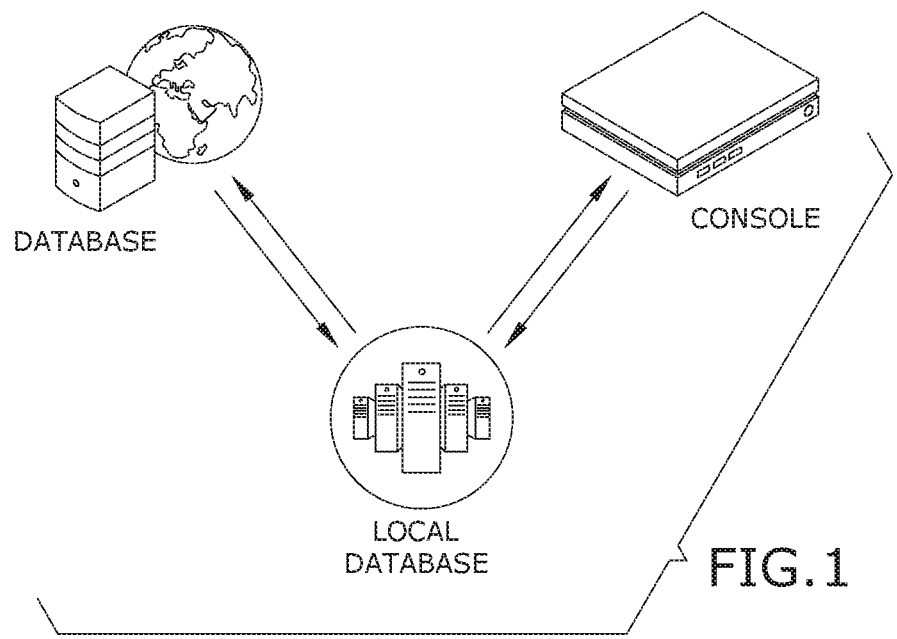
FIG. 1 is a block diagram of a system for extracting real-world locations and objects for map making according to an embodiment of the subject technology.

Referring now to FIG. 1, a system 100 for extracting real-world locations and objects for map making is shown according to an embodiment. The system 100 may include a plurality of different computing device types 10. In general, a computing device type 10 may be a computer system or computer server. In an exemplary embodiment, one type of computing device may be a player console, which is used by player users to access a gaming environment. While a home-based gaming console is shown, it will be understood that other types of gaming devices may be used including for example, personal computer systems, smart phones, hand-held electronics, and wearable devices (including for example, augmented or virtual reality wearable systems). In some embodiments, the gaming console may be connected in communication with another type of computing device 10, a local database computing device. The local database may be inside the gaming console or external to the console. The local database may be connected in communication with another type of computing device 10, a remote database computing device. However, in some embodiments, the gaming console may be in direct communication with the remote database. As will be discussed in further detail below, player interaction with a gaming environment may be tracked, especially with respect to players marking objects, travelling along or within locations, and/or affecting objects or locations in their environment.

Figure 2:
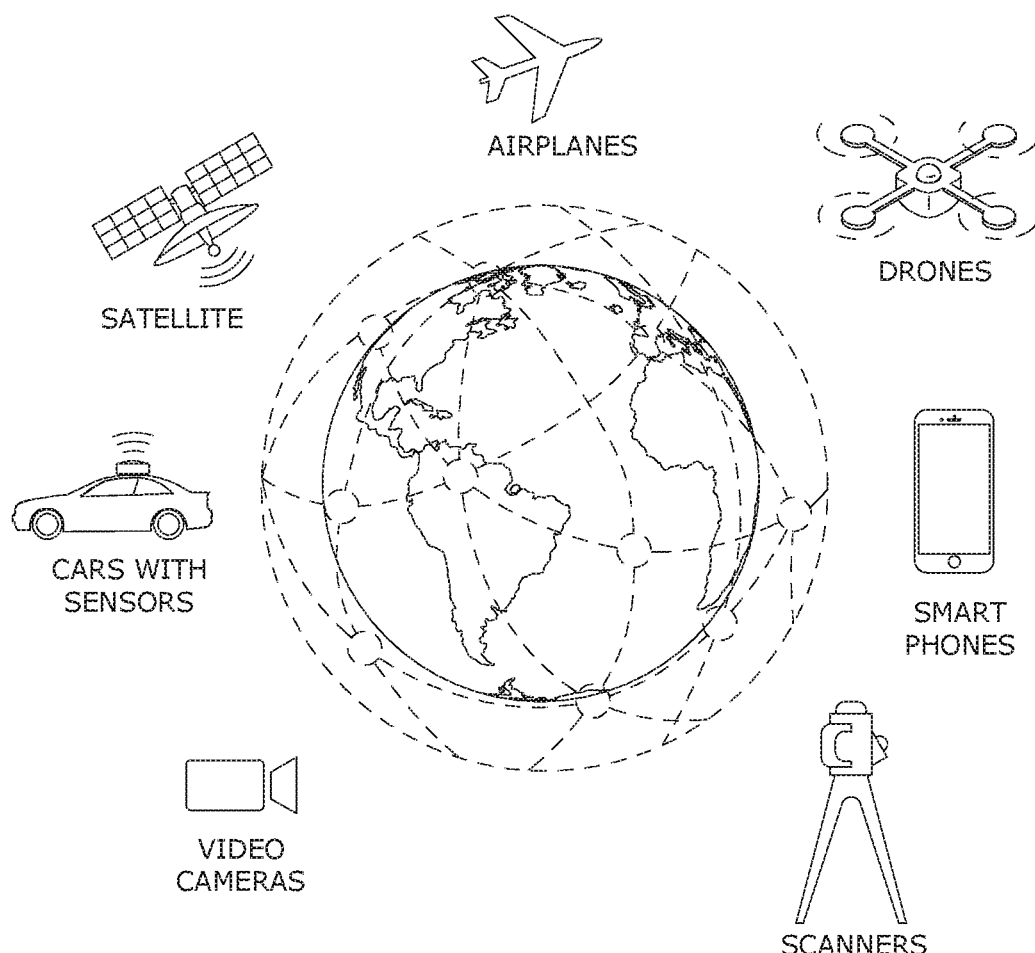
FIG. 2 is a diagrammatic view of sensors and data sources for the data used for extracting real-world locations and objects according to an embodiment of the subject technology.

The computing device 10 may be described in the general context of computer system executable instructions, such as program modules, being executed by a computer system (described for example, below). In some embodiments, the computing device 10 may be a cloud computing node (for example, in the role of a computer server) connected to a cloud computing network (not shown). The computing device 10 may be practiced in distributed cloud computing environments where tasks are performed by remote processing devices that are linked through a communications network. In a distributed cloud computing environment, program modules may be located in both local and remote computer system storage media including memory storage devices. Referring now to FIGS. 1 and 2 concurrently, a network may include computing devices 10 globally which server the role as servers/nodes collecting mapping information from sensor sources 50 around the world. Some of the sensor sources 50 may be computing devices 10 (for example, smart phones capturing images provided by users). Other sensor sources 50 may be terrestrial, extraterrestrial, or in flight. For example, there are sensor source like RADAR/SAR, LIDAR, video cameras on automobiles, drones, satellites, and planes, which are recording data that is saved to some database that may be accessed. Data from the sensor sources 50 may be used to generate initial maps which may be used to simulate a location generated in a gaming environment as discussed in detail further below. Suspected objects and/or locations may be recognized by a machine learning engine based on for example, convolutional neural networks (CNN) that can take a few samples of objects recognized in the game and predict similar objects for an entire region like a city or a country and inserted into a generated digital environment until confirmed by interaction with user players.

The computing device 10 may typically include a variety of computer system readable media. Such media could be chosen from any available media that is accessible by the computing device 10, including non-transitory, volatile and non-volatile media, removable and non-removable media. The system memory could include random access memory (RAM) and/or a cache memory. A storage system can be provided for reading from and writing to a non-removable, non-volatile magnetic media device. The system memory may include at least one program product having a set (e.g., at least one) of program modules that are configured to carry out the functions of embodiments of the invention. The program product/utility, having a set (at least one) of program modules, may be stored in the system memory. The program modules generally carry out the functions and/or methodologies of embodiments of the invention as described herein.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects "system." Furthermore, aspects of the disclosed invention may take the form of a computer program product embodied in one or more computer readable media having computer readable program code embodied thereon.

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 3:
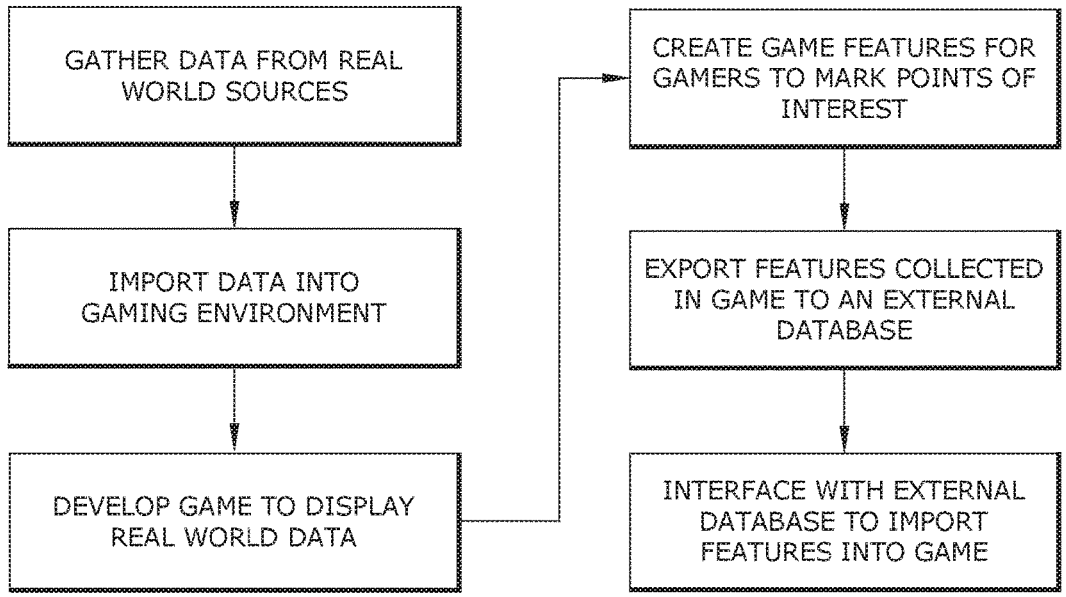
FIG. 3 is a flowchart of a method of extracting real-world locations and objects for map making according to an embodiment of the subject technology.

Referring now to FIG. 3, a method 300 of extracting real-world locations and objects for map making is shown according to an exemplary embodiment. The method 300 may include gathering data from real world sources. For example, the sensor sources shown in FIG. 2 are examples of some sources and it will be understood that other sources may be included. The data from sources may gather information on elements that may be used to build a map. For example, location (latitude, longitude, elevation) may be associated with topography, natural structures (for example, hill/mountain terrain, bodies of water, trees/vegetation, etc.), and man-made structures (for example, roads, buildings, bridges, etc.). The data may be gathered by a LiDAR sensor on a plane or on an automobile, collecting 3D point data of a location, smart phone cameras mounted on an automobile dashboard recording video of streets and surrounding areas as the automobile drives by, overhead photos collected using planes or drones of locations, and others. The gathered data may be imported (320) into a game engine. A game engine will stream this data to a gamer as they log into the game and/or games are created with the real-world data replacing synthetic textures for example, textures used in pre-existing games today. The data from disparate sources has been processed to consistently represent the real-world location. A game engine may develop (330) a construct that displays the real-world gathered data in a gaming environment. The game engine may create (340) game features in the gaming environment that player users may interact with. The features may include suspected points of interest that are real-world locations and objects gathered from the sources. The game features may include for example, locations, suspected paths (roads, bike paths, dirt paths, waterways, sidewalks, stairs, mechanical paths (escalators, people conveyors, elevators), entrances/exits (doors, windows, etc.), businesses, landmarks, and indoor locations and objects. It will be understood that the points of interest may include more than the examples described. As the user players interact with the game environment, they may score points for example, by marking the points of interest verifying that the locations or actual objects are present. An example would be location windows as objects. Gamers might be asked to shoot paint balls at windows and mark the location of window objects within the game. The interaction of a player user with features in game may be exported (350) to an external database (see for example, FIG. 1). In an exemplary embodiment, some of the points of interest in the simulated real-world location may be generated through machine learning. A machine learning aspect may estimate the likelihood of an unknown real-world object being in an estimated real-world location. The estimation may be based on for example, the presence of other real-world objects proximate the real-world location provided by the gathered data. This data is stored in an external database and is brought back into the game. An example would be steps taken on a few dirt trails in a game, sent to the machine learning to identify all dirt trails in an area like the mountain ranges in all of Colorado. A machine learning algorithm identifies the dirt trails and information is stored in an external database and brought back into the game. Another example would be an existing external database of roads from a different source like the U.S. Census Bureau that can be imported into the game.

Figure 4:
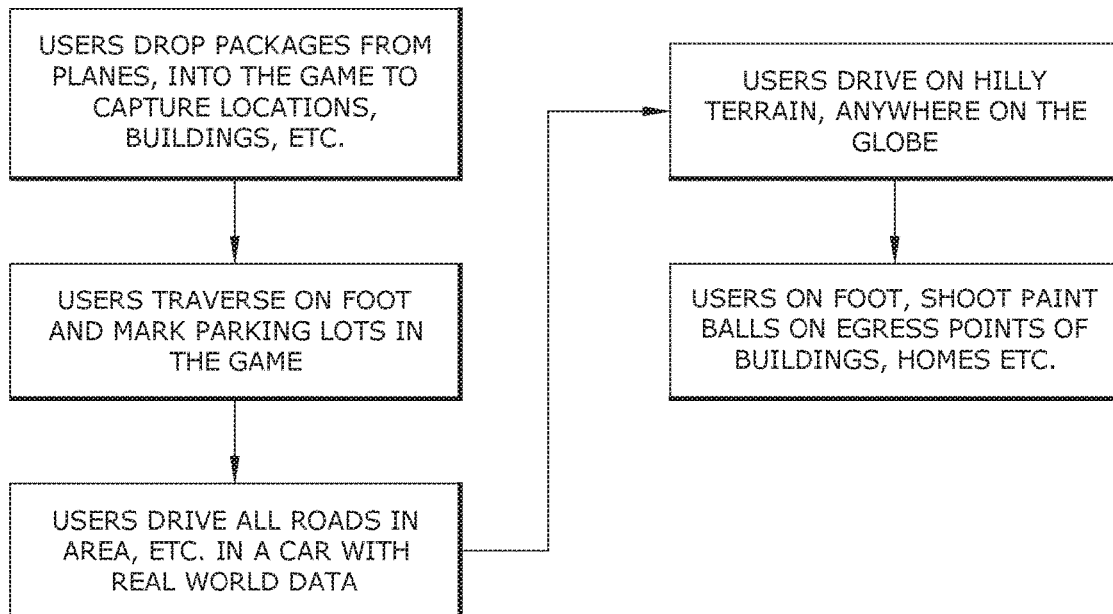
FIG. 4 a flowchart of a method of c according to an embodiment of the subject technology.

Referring not to FIG. 4, a method 400 of user interaction in a gaming environment for extracting real-world locations and objects is shown according to an exemplary embodiment. While the following is described in the context of user player interaction with the game environment, it will be understood that the method is primarily the system recognizing the actions and processing them accordingly. The method 400 describes various ways in which a player user may interact with the world around them. In some embodiments, the game environment is an augmented or virtual reality setting. In an augmented reality setting, it will be appreciated that the payer user may see the real-world and, in some embodiments, suspected points of interest may have virtual replicas super-imposed over their suspected real-world locations. A game setting may use the various method step approaches to confirm the real-world presence of points of interest. For example, player users may in one game action type, drop (410) packages from moving vehicles such as an airplane, into the game environment "capture" locations of all parking lots, tops of buildings, balconies of multistoried buildings, etc. or a gamer has to hit a window or a door of a building multiple times, to gather points which is used to identify objects of doors and windows in real world. In another game action type, player users may traverse (420) an area (for example, parking lot). The steps taken may confirm for example, an area traversable by foot. Player users may drive (430) through roads in an area, the movement of which may be tracked to confirm a vehicle roadway. Player users may drive (440) over different terrain types, for example, a hilly area, the movement of which may track changes in elevation as well as a generally drivable area. Player users may use (450) a virtual device (for example, a digital paint marker) to aim at and mark an object (for example, egress points of buildings, homes in an area, etc.).

Figure 5:
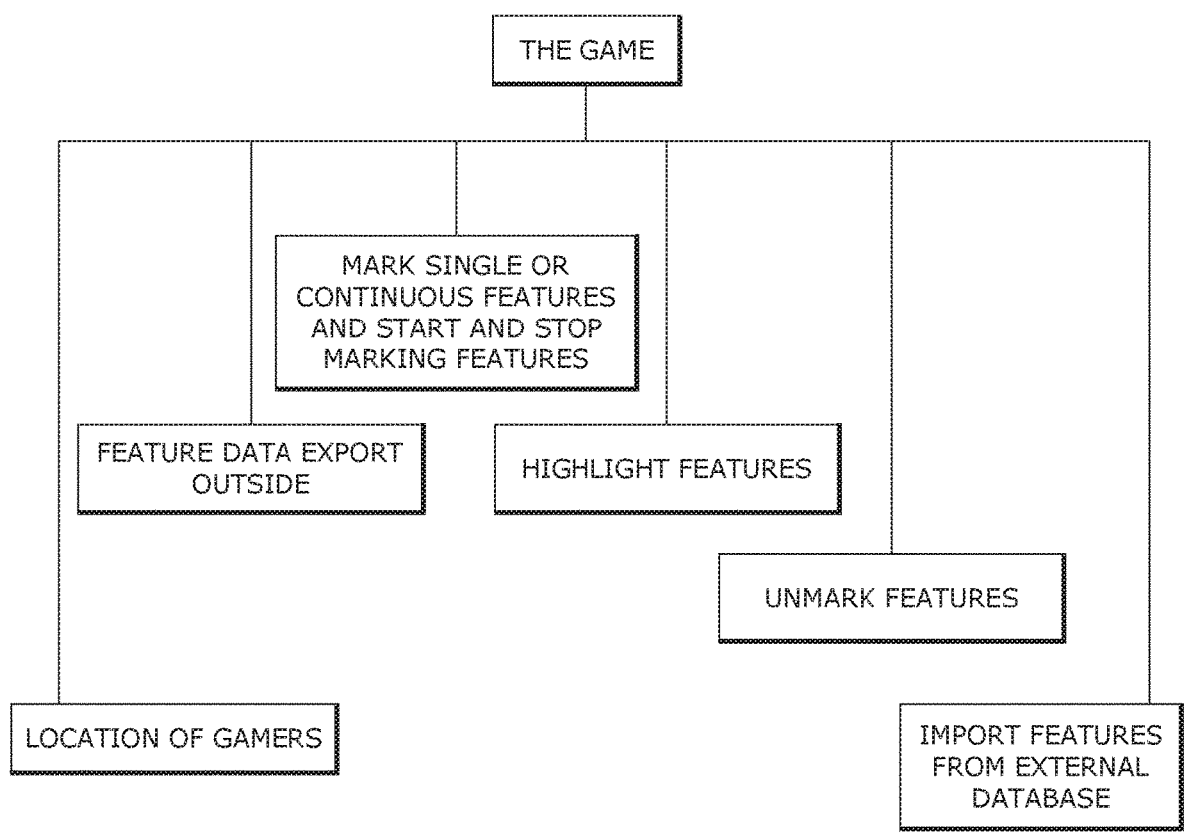
FIG. 5 is a block diagram of data elements provided by gamers used to confirm the presence of real-world locations and objects according to an embodiment of the subject technology.

Referring now to FIG. 5, a block diagram of a system 500 of data elements provided by gamers used to confirm the presence of real-world locations and objects is shown according to an exemplary embodiment. As discussed above, real-world data is gathered and used to create a gaming environment. As player users interact with the gaming environment, the interaction data may be continuously updated to confirm or deny the presence of suspected real-world locations and objects in an area. The information may be used to generate a map which may be updated as players continue to interact with the analogous virtual world through the game 510. As may be appreciated, the real-world may change over time and locations (such as businesses or buildings in general) may change or disappear altogether. Thus, maps become outdated and less useful. The data may be bi-directional as real-world data used to generate the gaming environment may be updated and similarly, confirmation data through player interaction (by for example, continuous marking (520) (or lack of marking which leads to unmarking (560)) of features in the game 510 may flow from the game 510 to update real-world maps. The location 550 of player users may be continuously tracked and games/maps may be selected based on the location. Features (points of interest) of suspected objects/locations may be highlighted (540). Highlighted features that are interacted with by player users may confirm the presence of the feature. Marked features may be exported externally from the game for use in generating or updating maps. However, it will be understood that while map making may be a particular application that benefits from the disclosed solution, other applications may use the data as well with similar benefit. In addition, the game environment may be continuously updated by importation (570) of features gathered by and suspected to be present by the use of the real-world sensor sources 50 (FIG. 1).

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A computer program product for extracting real-world locations and objects for map making, the computer program product comprising a non-transitory computer readable storage medium having computer readable program code embodied therewith, the computer readable program code being configured to:

gather data of actual real-world locations and real-world objects;

simulate a real-world location based on the gathered data through an electronic environment, wherein the electronic environment includes features representing virtual objects;

receive a login of a user for participation within the electronic environment;

track actions of the user in the simulated real-world location, wherein the actions include marking the virtual objects;

export tracked actions to a database;

confirm the presence of actual real-world locations and real-world objects based on the marking of the virtual objects, wherein the virtual objects are placed in the simulated real-world location corresponding to actual real-world locations; and generate an updated map of the actual real-world location using the confirmed presence of actual real-world locations and real-world objects.

2. The computer program product of claim 1, wherein the electronic environment is an augmented reality.

3. The computer program product of claim 2, further comprising computer readable program code being configured to track a position of the user in the augmented reality and confirm a real-world pathway based on the tracked position of the user moving along a simulated pathway.

4. The computer program product of claim 1, wherein the gathered data of the actual real-world locations includes topography, natural structures, and man-made structures in the real-world locations.

5. The computer program product of claim 1, wherein one or more points of interest in the simulated real-world location are generated by estimating a likelihood of an unknown real-world object being in an estimated real-world location based on the presence of other real-world objects proximate the real-world location provided by the gathered data.

6. A method for extracting real-world locations and objects for map making, comprises:

gathering data of actual real-world locations and real-world objects;

simulating a real-world location based on the gathered data through an electronic environment, wherein the electronic environment includes features representing virtual objects;

receiving a login of a user for participation within the electronic environment;

tracking actions of the user in the simulated real-world location, wherein the actions include marking the virtual objects;

exporting tracked actions to a database;

confirming the presence of actual real-world locations and real-world objects based on the marking of the virtual objects, wherein the virtual objects are placed in the simulated real-world location corresponding to actual real-world locations; and generating an updated map of the actual real-world location using the confirmed presence of actual real-world locations and real-world objects.

7. The method of claim 6, wherein the electronic environment is an augmented reality.

8. The method of claim 7, further comprising tracking a position of the user in the augmented reality and confirming a real-world pathway based on the tracked position of the user moving along a simulated pathway.

9. The method of claim 6, wherein the gathered data of the actual real-world locations includes topography, natural structures, and man-made structures in the real-world locations.

10. The method of claim 6, wherein one or more points of interest in the simulated real-world location are generated by estimating a likelihood of an unknown real-world object being in an estimated real-world location based on the presence of other real-world objects proximate the real-world location provided by the gathered data.

* * * * *